United States Patent
Chen et al.

(10) Patent No.: US 12,485,487 B2
(45) Date of Patent: Dec. 2, 2025

(54) ZONAL TRABECULAR UNI-COMPARTMENTAL FEMORAL CONDYLAR COMPONENT CONTAINING ZIRCONIUM-NIOBIUM ALLOY ON OXIDATION LAYER AND PREPARATION METHOD THEREOF

(71) Applicant: Just Medical Devices (Tianjin) Co., Ltd., Tianjin (CN)

(72) Inventors: Wei Chen, Tianjin (CN); Yu Cao, Tianjin (CN); Yuejing Zhang, Tianjin (CN); You Yang, Tianjin (CN); Li Li, Tianjin (CN)

(73) Assignee: Just Medical Devices (Tianjin) Co., Ltd., Tianjin (CN)

( * ) Notice: Subject to any disclaimer, the term of this patent is extended or adjusted under 35 U.S.C. 154(b) by 361 days.

(21) Appl. No.: 17/907,913

(22) PCT Filed: Jun. 21, 2021

(86) PCT No.: PCT/CN2021/101288
§ 371 (c)(1),
(2) Date: Aug. 29, 2022

(87) PCT Pub. No.: WO2022/088705
PCT Pub. Date: May 5, 2022

(65) Prior Publication Data
US 2023/0321729 A1   Oct. 12, 2023

(30) Foreign Application Priority Data
Oct. 30, 2020 (CN) .......................... 202011191014.8

(51) Int. Cl.
*B22F 10/64* (2021.01)
*A61F 2/38* (2006.01)
(Continued)

(52) U.S. Cl.
CPC ............ *B22F 10/64* (2021.01); *A61F 2/3859* (2013.01); *B22F 3/1007* (2013.01); *B22F 10/66* (2021.01);
(Continued)

(58) Field of Classification Search
CPC .......... A61F 2/3859; A61F 2002/30985; A61F 2310/00089; A61F 2310/00095;
(Continued)

(56) References Cited

U.S. PATENT DOCUMENTS 5,477,864 A   12/1995   Davidson

FOREIGN PATENT DOCUMENTS

| CN | 105030383 A | 11/2015 |
|---|---|---|
| CN | 205019202 U | 2/2016 |

(Continued)

OTHER PUBLICATIONS

International Search Report of PCT/CN2021/101288.
Written Opinion of PCT/CN2021/101288.

*Primary Examiner* — Javier G Blanco

(57) ABSTRACT

The present disclosure discloses a zonal trabecular uni-compartmental femoral condylar component containing zirconium-niobium alloy on oxidation layer and preparation method, including following steps: using zirconium niobium alloy powder as raw material, conducting a 3D printing for one-piece molding to obtain an intermediate product of the uni-compartmental femoral condylar component, performing hot isostatic pressing and cryogenic oxidation to obtain the uni-compartmental femoral condylar component; the uni-compartmental femoral condylar component includes an articular surface and an osseointegration surface, a bone trabeculae is arranged on the osseointegration surface. The present invention can reduce the fretting wear of the interface between the prosthesis and the bone, and reduce the
(Continued)

stress shielding effect of the prosthesis on the bone tissue, homogenize the stress of the femoral condylar bone tissue, and improve the initial stability and long-term stability of the uni-compartmental femoral condylar component.

6 Claims, 12 Drawing Sheets

(51) Int. Cl.
*B22F 3/10* (2006.01)
*B22F 10/66* (2021.01)
*B33Y 40/20* (2020.01)
*B33Y 70/00* (2020.01)
*B33Y 80/00* (2015.01)
*C22C 16/00* (2006.01)
*A61F 2/30* (2006.01)

(52) U.S. Cl.
CPC ............... *B33Y 40/20* (2020.01); *B33Y 70/00* (2014.12); *B33Y 80/00* (2014.12); *C22C 16/00* (2013.01); *A61F 2002/30224* (2013.01); *A61F 2002/30878* (2013.01); *A61F 2002/3093* (2013.01); *A61F 2002/30968* (2013.01); *A61F 2002/30985* (2013.01); *A61F 2310/00089* (2013.01); *A61F 2310/00095* (2013.01); *B22F 2301/205* (2013.01)

(58) Field of Classification Search
CPC ... B22F 10/00; B22F 5/00; B22F 3/15; B33Y 10/00; B33Y 70/00; B33Y 80/00
See application file for complete search history.

(56) References Cited

FOREIGN PATENT DOCUMENTS

| | | |
|---|---|---|
| CN | 108472730 A | 8/2018 |
| CN | 109385548 A | 2/2019 |
| CN | 112296342 A | 2/2021 |
| WO | 2010036191 A1 | 4/2010 |

ZONAL TRABECULAR UNI-COMPARTMENTAL FEMORAL CONDYLAR COMPONENT CONTAINING ZIRCONIUM-NIOBIUM ALLOY ON OXIDATION LAYER AND PREPARATION METHOD THEREOF

CROSS-REFERENCE TO RELATED APPLICATIONS

This Application is a national stage application of PCT/CN2021/101288. This application claims priorities from PCT Application No. PCT/CN2021/101288, filed Jun. 21, 2021, and from the Chinese patent application 202011191014.8 filed Oct. 30, 2020, the content of which are incorporated herein in the entirety by reference.

TECHNICAL FIELD

The present disclosure relates to the technical field of artificial joint, especially the zonal trabecular uni-compartmental femoral condylar component containing zirconium-niobium alloy on oxidation layer and preparation method thereof.

BACKGROUND TECHNOLOGY

Uni-compartmental knee prosthesis is used for surface replacement of unilateral diseased compartment of knee joint. It has the characteristics of small surgical incision, less intraoperative osteotomy and preservation of knee ligament structure. Therefore, it can recover quickly after single condylar replacement and preserve the normal movement and proprioception of knee joint.

Biological uni-compartmental knee prosthesis can effectively chime the interface between bone tissue and prosthesis and avoid the defects caused by bone cement fixation. At present, biological uni-compartmental knee prosthesis is mostly processed with double coating (e.g. titanium micropore & HA coating), which has problems such as coating falling off and uneven coating thickness. Moreover, the main reason for the failure of artificial joint replacement is the loosening of the prosthesis. The stress shielding caused by the huge stiffness mismatch between the prosthesis and bone will cause the bone remodeling around the prosthesis and lead to the loosening of the prosthesis. The matrix portion of the existing biological uni-compartmental knee prosthesis is still a solid structure, and its elastic modulus is much greater than that of bone tissue, which will greatly increase the stress shielding effect between the prosthesis and bone interface and then reduce the formation of osteoblasts, and finally lead to prosthesis loosening.

In addition, because the mechanical environment of the osteotomy surface of the posterior condyle of the biological unicompartmental knee prosthesis is shear force and the bone mineral density of this position is relatively low, and the bone absorption in the bone tissue area from the fixed column to the posterior condyle is common in clinic, which is very easy to cause the prosthesis to loosen for a long time. The uniform trabecular uni-compartmental knee prosthesis made of 3D printing can reduce the stress shielding effect to a certain extent, which can improve the long-term survival rate of the prosthesis. However, due to the mechanical differences of bone tissue in different regions and the differences of mechanical environment of prosthesis in different regions, these differences will cause the non-uniformity of fixation although using the uniform trabecular uni-compartmental knee prosthesis, which will cause a certain impact on the long-term stability of prosthesis and increase the risk of failure.

Zirconium-niobium alloy has been gradually used in the field of medical devices for its excellent corrosion resistance, mechanical properties and good biocompatibility. Zirconium-niobium alloy can react with N, C, O or other elements to form a hard ceramic layer on the surface. It has excellent wear resistance and low wear rate, which can reduce the wear of soft materials, that is, it has excellent wear resistance of joint articular surface. Moreover, the ceramic layer can reduce the release of metal ions and has excellent biocompatibility, that is, excellent biocompatibility at the osseointegration interface. The low wear rate of the articular surface is combined organically with the osseointegration interface (trabecula), which has excellent bone ingrowth performance, enabling the prosthesis to achieve the advantages of both interfaces at the same time. However, there is no existing report on the preparation of zonal trabecular uni-compartmental femoral condylar component containing zirconium-niobium alloy on oxidation layer.

3D printing technology, as an additive manufacturing technology, breaks through the manufacturing process-oriented product design concepts, and realizes the performance-oriented product design concept, that is, to solve the problem of complex parts that are difficult to form as a whole, and to reduce the waste of raw materials and energy caused by machining and manufacturing. However, the 3D printing products are prone to problems such as uneven microstructure and internal defects, and poor mechanical properties. The failure of powder fusion in part of trabecular structure also results in poor mechanical properties.

In view of the shortcomings of the prior art, people skilled in the art in this technical field are devoted to developing zonal trabecular uni-compartmental femoral condylar component containing zirconium-niobium alloy with oxidation layer which has excellent mechanical properties and realizing the advantages of two interfaces, so as to improve the fixation reliability of uni-compartmental femoral condylar component and the initial and long-term stability of prosthesis.

SUMMARY OF THE DISCLOSURE

One of the objectives of the present disclosure is to overcome the deficiencies of the existing technology to provide a zonal trabecular uni-compartmental femoral condylar component containing zirconium-niobium alloy on oxidation layer.

The second objective of the present disclosure is to provide a preparation method of the zonal trabecular uni-compartmental femoral condylar component containing zirconium-niobium alloy on oxidation layer.

The technical scheme of the present disclosure is outlined as follows:

The preparation method of the zonal trabecular uni-compartmental femoral condylar component containing zirconium-niobium alloy on oxidation layer includes the following steps:

1) Using zirconium-niobium alloy powder as a raw material, conducting a 3D printing for one-piece molding, and obtaining a first intermediate product of the zonal trabecular uni-compartmental femoral condylar component containing zirconium-niobium alloy on oxidation layer, putting the first intermediate product into a Sinter-HIP furnace, heating to 1250° C.-1400° C. under helium/argon gas protection, and placing at a constant pressure of 140 MPa to 180 MPa for 1 h to 3 h, and reducing to a normal pressure, cooling to below 200° C. with the furnace, taking it out, and obtaining a second intermediate product;

2) Putting the second intermediate product into a programmed cooling box, cooling to −80° C. to −120° C. at a rate of 1° C./min, keeping it at a constant temperature for 5 h to 10 h, and taking it out of the programmed cooling box; and putting it into a liquid nitrogen for 16 h to 36 h, and adjusting the temperature to a room temperature so as to obtain a third intermediate product;

3) Putting the third intermediate product in a programmed cooling box, cooling to −80° C. to −120° C. at a rate of 1° C./min, and placing it at a constant temperature for 5 h to 10 h, taking it out of the programmed cooling box, and putting it into the liquid nitrogen for 16 h to 36 h, and adjusting the temperature to room temperature so as to obtain a fourth intermediate product;

4) Machining, finishing, polishing, cleaning, and drying the fourth intermediate product, and obtaining a fifth intermediate product, where the upper surface roughness of the articular surface of the fifth intermediate is Ra≤0.050 μm;

5) Putting the fifth intermediate product into a tube furnace, introducing the normal-pressure helium/argon gas containing 5% to 15% of oxygen in percentage by mass, heating to 500° C. to 700° C. at 5° C./min to 20° C./min, and cooling to 400° C. to 495° C. at 0.4° C./min to 0.9° C./min, and cooling to be below 200° C. sequentially, take it out to obtain the zonal trabecular uni-compartmental femoral condylar component containing zirconium-niobium alloy on oxidation layer.

The structure of the zonal trabecular uni-compartmental femoral condylar component containing zirconium-niobium alloy on oxidation layer is same as the structure of the first intermediate product, the second intermediate product, the third intermediate product, the fourth intermediate product and the fifth intermediate product.

The zonal trabecular uni-compartmental femoral condylar component containing zirconium-niobium alloy on oxidation layer includes an articular surface 1 and an osseointegration surface 2, the longitudinal section of the articular surface 1 is arc-shaped, the osseointegration surface 2 comprises a rear osseointegration surface 21 and a distal osseointegration surface 22, the rear osseointegration surface 21 is arranged in a vertical plane, the distal osseointegration surface 22 is arc-shaped which has a common spherical center with the articular surface 1; a first cylindrical fixation 4 is arranged in the middle of the distal osseointegration surface 22, a second cylindrical fixation 5 is arranged at the front of the distal osseointegration surface 22; and the diameter of the second cylindrical fixation 5 is smaller than that of the first cylindrical fixation 4; a side wall 3 is arranged at the edge of the osseointegration surface 2, a bone trabeculae 6 is arranged in the side wall 3 except the location where connecting the first cylindrical fixation 4 and the second cylindrical fixation 5; a bone trabecular partition line 7 is positioned in the middle of the front and rear direction of the osseointegration surface 2; a first bone trabeculae 8 and a second bone trabeculae 9 are respectively arranged before and after the bone trabecular partition line 7; and the pore size and porosity of the first bone trabeculae 8 is smaller than those of the second bone trabeculae 9.

The pore size of the first bone trabeculae 8 ranges from 0.40 mm to 0.60 mm, the porosity ranges from 60% to 75%.

The pore size of the second bone trabeculae 9 ranges from 0.61 mm to 0.80 mm, the porosity ranges from 76% to 90%; the thickness of the first bone trabeculae 8 and the second bone trabeculae 9 are equal to 1 mm to 2 mm.

The chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 μm.

The specific steps for adjusting the temperature in steps 2) and 3) are: increasing the temperature to −120° C. to −80° C. and keeping the constant temperature for 3 h to 5 h; then increasing the temperature to −40° C. to −20° C. and keeping the constant temperature for 3 h to 5 h; then increasing the temperature to 4° C. to 8° C. and keeping the constant temperature for 1 h to 3 h and then increasing the temperature.

The zonal trabecular uni-compartmental femoral condylar component containing zirconium-niobium alloy on oxidation layer prepared by the above method.

The present disclosure has the following beneficial effects:

The zonal trabecular uni-compartmental femoral condylar component containing zirconium-niobium alloy on oxidation layer in the present disclosure can reduce the fretting wear of the interface between the prosthesis and the bone, and reduce the stress shielding effect of the prosthesis on the bone tissue, homogenize the stress of the tibial plateau bone tissue, and improve the initial stability and long-term stability of the uni-compartmental tibial plateau.

Using integral 3D printing technology, the present disclosure solves the problem that traditional machining cannot prepare a complex structure, and has high bonding strength between trabeculae and the matrix, therefore it is not easy to fall off, thereby improving the service life of the prosthesis.

The zonal trabecular uni-compartmental femoral condylar component containing zirconium-niobium alloy on oxidation layer has excellent anti-compression performance. And the compressive yield strength of the solid part is enhanced, and the plasticity is enhanced. The zonal trabecular uni-compartmental femoral condylar component containing zirconium-niobium alloy on oxidation layer is integrated to realize the excellent biocompatibility of the osseointegration interface, outstanding bone ingrowth, and a friction interface with super wear resistance and low wear rate. There is an oxygen-rich layer between the oxidation layer and the matrix of the uni-compartmental femoral condylar component prepared by the present disclosure. The oxygen-rich layer acts as a transition layer, which can improve the adhesion between the oxidation layer and the matrix, and can prevent the oxidation layer from falling off. Moreover, the hardness of the oxidation layer is high. The zonal trabecular uni-compartmental femoral condylar component containing zirconium-niobium alloy on oxidation layer has low artifacts, little interference to nuclear magnetic field, and can be used for nuclear magnetic field detection.

DETAILED DESCRIPTION OF THE EMBODIMENTS

Figure 1:
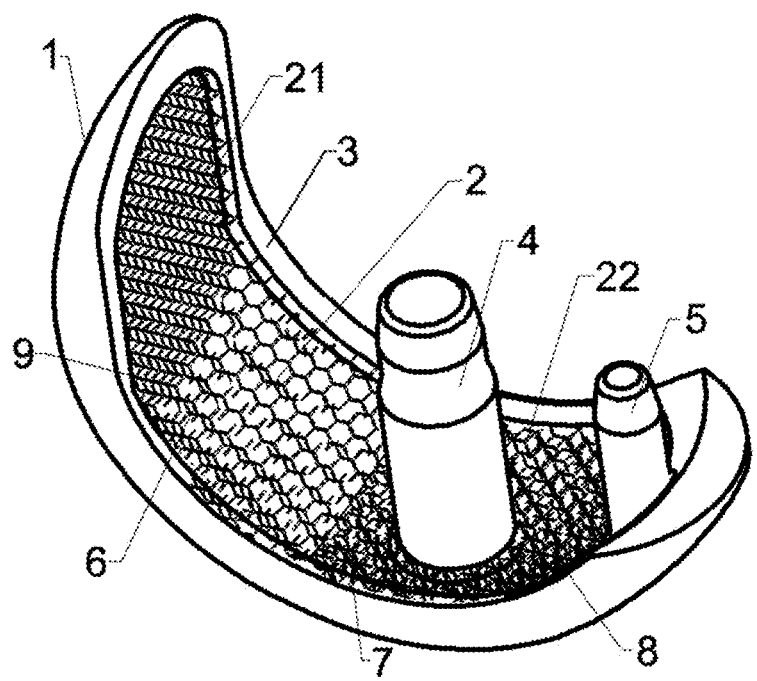
FIG. 1 shows a structural diagram of the zonal trabecular uni-compartmental femoral condylar component containing zirconium-niobium alloy on oxidation layer of the present disclosure.
Figure 2:
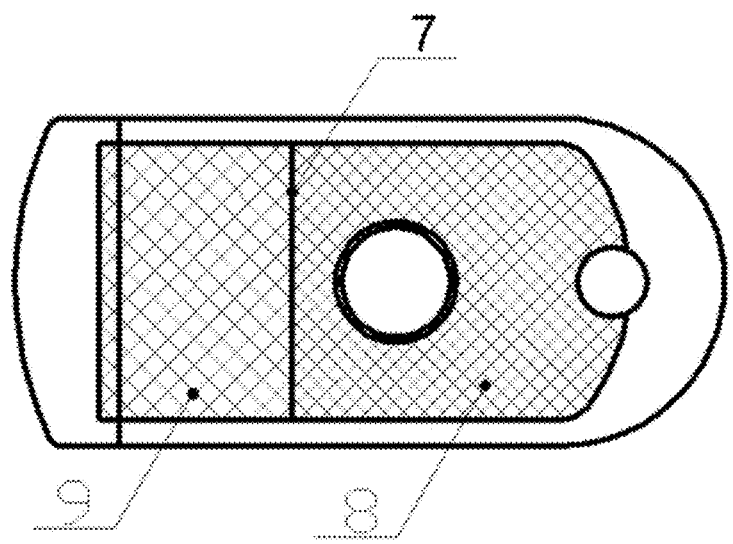
FIG. 2 shows a top view of the zonal trabecular uni-compartmental femoral condylar component containing zirconium-niobium alloy on oxidation layer of the present disclosure.

The present disclosure will be further described below with the drawings and embodiments.

Embodiment 1

The preparation method of the zonal trabecular uni-compartmental femoral condylar component containing zirconium-niobium alloy on oxidation layer includes the following steps:
1) Using zirconium-niobium alloy powder as a raw material, conducting a 3D printing for one-piece molding, and obtaining a first intermediate product of the zonal trabecular uni-compartmental femoral condylar component containing zirconium-niobium alloy on oxidation layer, putting the first intermediate product into a Sinter-HIP furnace, heating to 1250° C. under helium gas protection, and placing at a constant pressure of 180 MPa for 3 h, and reducing to a normal pressure, cooling to below 200° C. with the furnace, taking it out, and obtaining a second intermediate product;
2) Putting the second intermediate product into a programmed cooling box, cooling to −80° C. at a rate of 1° C./min, keeping it at a constant temperature for 10 h and taking it out of the programmed cooling box; and putting it into a liquid nitrogen for 16 h, and adjusting the temperature to a room temperature so as to obtain a third intermediate product;
3) Putting the third intermediate product in a programmed cooling box, cooling to −80° C. at a rate of 1° C./min, and placing it at a constant temperature for 10 h, taking it out of the programmed cooling box, and putting it into the liquid nitrogen for 16 h, and adjusting the temperature to room temperature so as to obtain a fourth intermediate product;

Wherein, the specific steps for adjusting the temperature in steps 2) and 3) are: increasing the temperature to −120° C. and keeping the constant temperature for 5 h; then increasing the temperature to −40° C. and keeping the constant temperature for 5 h; then increasing the temperature to 4° c and keeping the constant temperature for 3 h and then increasing the temperature.
4) Machining, finishing, polishing, cleaning, and drying the fourth intermediate product, and obtaining a fifth intermediate product, where the upper surface roughness of the articular surface of the fifth intermediate is Ra=0.012 μm;
5) Putting the fifth intermediate product into a tube furnace, introducing the normal-pressure helium gas containing 5% of oxygen in percentage by mass, heating to 500° C. at 5° C./min, and cooling to 400° C. at 0.4° C./min, and cooling to be below 200° C. sequentially, take it out to obtain the zonal trabecular uni-compartmental femoral condylar component containing zirconium-niobium alloy on oxidation layer.

The structure of the zonal trabecular uni-compartmental femoral condylar component containing zirconium-niobium alloy on oxidation layer is same as the structure of the first intermediate product, the second intermediate product, the third intermediate product, the fourth intermediate product and the fifth intermediate product. The chemical composition of the zirconium-niobium alloy powder in percentage by mass is respectively 85.6% of Zr, 12.5% of Nb, and the rest are unavoidable impurities; where a particle size of the zirconium-niobium alloy powder ranges from 45 to 150 μm, purchased from Xi'an Sailong Metal Materials Co., Ltd.

The zonal trabecular uni-compartmental femoral condylar component containing zirconium-niobium alloy on oxidation layer includes an articular surface 1 and an osseointegration surface 2, the longitudinal section of the articular surface 1 is arc-shaped, the osseointegration surface 2 comprises a rear osseointegration surface 21 and a distal osseointegration surface 22, the rear osseointegration surface 21 is arranged in a vertical plane, the distal osseointegration surface 22 is arc-shaped which has a common spherical center with the articular surface 1; a first cylindrical fixation 4 is arranged in the middle of the distal osseointegration surface 22, a second cylindrical fixation 5 is arranged at the front of the distal osseointegration surface 22; and the diameter of the second cylindrical fixation 5 is smaller than that of the first cylindrical fixation 4; a side wall 3 is arranged at the edge of the osseointegration surface 2, a bone trabeculae 6 is arranged in the side wall 3 except the location where connecting the first cylindrical fixation 4 and the second cylindrical fixation 5; a bone trabecular partition line 7 is positioned in the middle of the front and rear direction of the osseointegration surface 2; a first bone trabeculae 8 and a second bone trabeculae 9 are respectively arranged before and after the bone trabecular partition line 7; and the pore size and porosity of the first bone trabeculae 8 is smaller than those of the second bone trabeculae 9.

The pore size of the first bone trabeculae 8 is 0.50 mm, the porosity is 70%.

The pore size of the second bone trabeculae 9 is 0.70 mm, the porosity is 80%; the thickness of the first bone trabeculae 8 and the second bone trabeculae 9 are equal to 1.5 mm.

Embodiment 2

The preparation method of the zonal trabecular uni-compartmental femoral condylar component containing zirconium-niobium alloy on oxidation layer includes the following steps:
1) Using zirconium-niobium alloy powder as a raw material, conducting a 3D printing for one-piece molding, and obtaining a first intermediate product of the zonal trabecular uni-compartmental femoral condylar component containing zirconium-niobium alloy on oxidation layer, putting the first intermediate product into a Sinter-HIP furnace, heating to 1325° C. under helium gas protection, and placing at a constant pressure of 160 MPa for 2 h, and reducing to a normal pressure, cooling to below 200° C. with the furnace, taking it out, and obtaining a second intermediate product;
2) Putting the second intermediate product into a programmed cooling box, cooling to −100° C. at a rate of 1° C./min, keeping it at a constant temperature for 7 h, and taking it out of the programmed cooling box; and putting it into a liquid nitrogen for 24 h, and adjusting the temperature to a room temperature so as to obtain a third intermediate product;
3) Putting the third intermediate product in a programmed cooling box, cooling to −100° C. at a rate of 1° C./min, and placing it at a constant temperature for 7 h, taking it out of the programmed cooling box, and putting it into the liquid nitrogen for 24 h, and adjusting the temperature to room temperature so as to obtain a fourth intermediate product;

Wherein, the specific steps for adjusting the temperature in steps 2) and 3) are: increasing the temperature to −100° C. and keeping the constant temperature for 4 h; then increasing the temperature to −30° C. and keeping the constant temperature for 4 h; then increasing the temperature to 6° C. and keeping the constant temperature for 2 h and then increasing the temperature.
4) Machining, finishing, polishing, cleaning, and drying the fourth intermediate product, and obtaining a fifth intermediate product, where the upper surface roughness of the articular surface of the fifth intermediate is Ra=0.035 μm;
5) Putting the fifth intermediate product into a tube furnace, introducing the normal-pressure helium gas containing 10% of oxygen in percentage by mass, heating to 600° C. at 15° C./min, and cooling to 450° C. at 0.7° C./min, and cooling to be below 200° C. sequentially, take it out to obtain the zonal trabecular uni-compartmental femoral condylar component containing zirconium-niobium alloy on oxidation layer.

The structure of the zonal trabecular uni-compartmental femoral condylar component containing zirconium-niobium alloy on oxidation layer is same as the structure of the first intermediate product, the second intermediate product, the third intermediate product, the fourth intermediate product and the fifth intermediate product.

The chemical composition of the zirconium-niobium alloy powder in percentage by mass is respectively 93.4% of Zr, 5.1% of Nb, and the rest are unavoidable impurities; where a particle size of the zirconium-niobium alloy powder ranges from 45 to 150 μm, purchased from Xi'an Sailong Metal Materials Co., Ltd.

The structure of the zonal trabecular uni-compartmental femoral condylar component containing zirconium-niobium alloy on oxidation layer in Embodiment 2 is similar as that of the Embodiment 2, the differences are as follows:

The pore size of the first bone trabeculae 8 is 0.40 mm, the porosity is 60%.

The pore size of the second bone trabeculae 9 is 0.61 mm, the porosity is 76%; the thickness of the first bone trabeculae 8 and the second bone trabeculae 9 are equal to 1 mm.

Embodiment 3

The preparation method of the zonal trabecular uni-compartmental femoral condylar component containing zirconium-niobium alloy on oxidation layer includes the following steps:
1) Using zirconium-niobium alloy powder as a raw material, conducting a 3D printing for one-piece molding, and obtaining a first intermediate product of the zonal trabecular uni-compartmental femoral condylar component containing zirconium-niobium alloy on oxidation layer, putting the first intermediate product into a Sinter-HIP furnace, heating to 1400° C. under argon gas protection, and placing at a constant pressure of 140 MPa for 2 h, and reducing to a normal pressure, cooling to below 200° C. with the furnace, taking it out, and obtaining a second intermediate product;
2) Putting the second intermediate product into a programmed cooling box, cooling to −120° C. at a rate of 1° C./min, keeping it at a constant temperature for 5 h, and taking it out of the programmed cooling box; and putting it into a liquid nitrogen for 36 h, and adjusting the temperature to a room temperature so as to obtain a third intermediate product;
3) Putting the third intermediate product in a programmed cooling box, cooling to −120° C. at a rate of 1° C./min, and placing it at a constant temperature for 5 h, taking it out of the programmed cooling box, and putting it into the liquid nitrogen for 36 h, and adjusting the temperature to room temperature so as to obtain a fourth intermediate product;

Wherein, the specific steps for adjusting the temperature in steps 2) and 3) are: increasing the temperature to −80° C. and keeping the constant temperature for 3 h; then increasing the temperature to −20° C. and keeping the constant temperature for 3 h; then increasing the temperature to 8° C. and keeping the constant temperature for 1 h and then increasing the temperature.
4) Machining, finishing, polishing, cleaning, and drying the fourth intermediate product, and obtaining a fifth intermediate product, where the upper surface roughness of the articular surface of the fifth intermediate is Ra=0.050 μm;
5) Putting the fifth intermediate product into a tube furnace, introducing the normal-pressure argon gas containing 15% of oxygen in percentage by mass, heating to 700° C. at 20° C./min, and cooling to 495° C. at 0.9° C./min, and cooling to be below 200° C. sequentially, take it out to obtain the zonal trabecular uni-compartmental femoral condylar component containing zirconium-niobium alloy on oxidation layer.

The structure of the zonal trabecular uni-compartmental femoral condylar component containing zirconium-niobium alloy on oxidation layer is same as the structure of the first intermediate product, the second intermediate product, the third intermediate product, the fourth intermediate product and the fifth intermediate product.

The chemical composition of the zirconium-niobium alloy powder in percentage by mass is respectively 96.5% of Zr, 1% of Nb, and the rest are unavoidable impurities; where a particle size of the zirconium-niobium alloy powder ranges from 45 to 150 µm, purchased from Xi'an Sailong Metal Materials Co., Ltd.

The structure of the zonal trabecular uni-compartmental femoral condylar component containing zirconium-niobium alloy on oxidation layer in Embodiment 2 is similar as that of the Embodiment 2, the differences are as follows:

The pore size of the first bone trabeculae 8 is 0.60 mm, the porosity is 75%.

The pore size of the second bone trabeculae 9 is 0.80 mm, the porosity is 90%; the thickness of the first bone trabeculae 8 and the second bone trabeculae 9 are equal to 2 mm.

Control Group 1

The structure of an uniform trabecular uni-compartmental femoral condylar component is similar to that of the Embodiment 1, the different structure between the uniform trabecular uni-compartmental femoral condylar component and the Embodiment 1 are as follows:

The first bone trabeculae 8 and the second bone trabeculae 9 are a same kind of the bone trabeculae with pore size of 0.50 mm, the porosity of 70%, and thickness of 1.5 mm.

Control Group 2

Using zirconium-niobium alloy powder as Embodiment 1 as a raw material, conducting a 3D printing for one-piece molding, and obtaining zonal trabecular uni-compartmental femoral condylar component which structure is same as that of the Embodiment 1.

Experiment Verification

Figure 3:
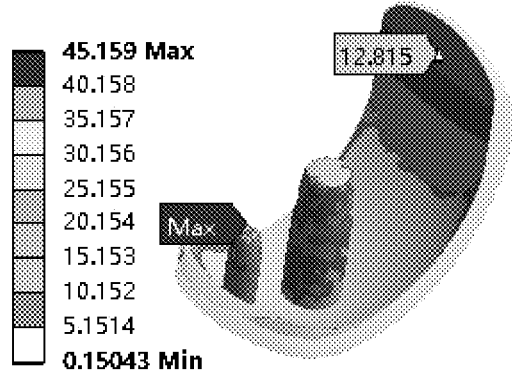
FIG. 3 is a fretting cloud chart showing the interface between the uniform uni-compartmental femoral condylar component finite element model and the host bone tissue finite element model of Control Group 1.
Figure 4:
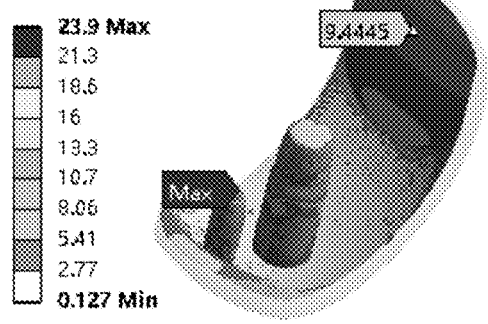
FIG. 4 is a fretting cloud chart showing the interface between the uni-compartmental femoral condylar component finite element model and the host bone tissue finite element model of Embodiment 1.

The reliable biological fixation of prosthesis bone interface mainly depends on the initial stability of prosthesis fixation. Excessive relative movement between prosthesis and bone interface will inhibit the process of bone integration. Studies have shown that when the fretting at the interface of prosthesis and bone exceeds 50 to 150 µm, a large amount of fibrous tissue will be formed at the bone interface, which will reduce the fixation strength of the prosthesis and eventually lead to prosthesis loosening. The finite element model of Control Group 1 and Embodiment 1 and the simplified cancellous bone partitioning model of the tibial plateau were analyzed by finite element analysis to obtain the fretting cloud map, as shown in FIGS. 3-4, compared with the uniform trabecular femoral condylar component of Control Group 1, the maximum fretting value at the interface between the zonal trabecular uni-compartmental femoral condylar component finite element model and the femoral condylar bone tissue finite element model in Embodiment 1 is 23.9 µm, decreased by 47%; the maximum fretting value at the posterior interface of the femoral condyle finite element model is 9.44 µm, decreased by 26%; suggesting that the present disclosure can obtain small fretting and has excellent initial stability.

Figure 5:
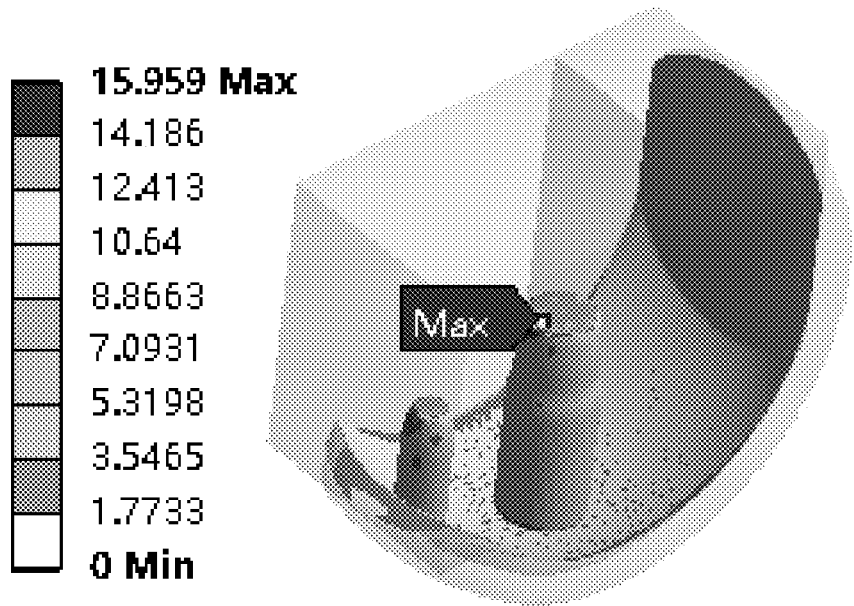
FIG. 5 is the contact pressure cloud chart showing the uniform trabecular uni-compartmental femoral condylar component finite element model of Control Group 1.
Figure 6:
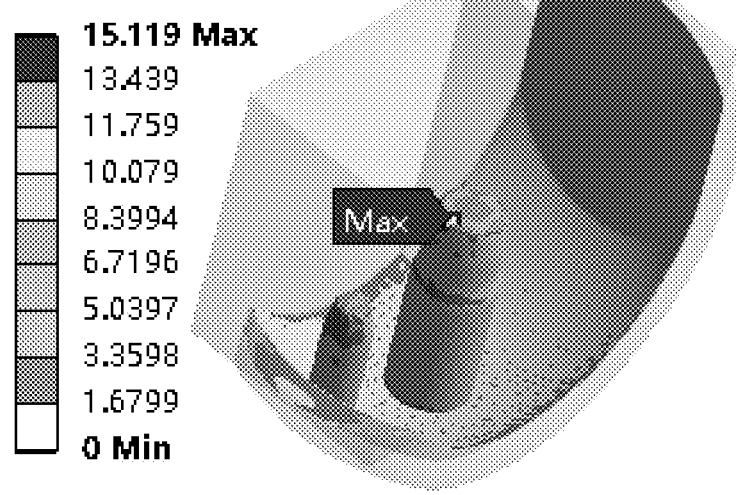
FIG. 6 is the contact pressure cloud chart showing the trabecular uni-compartmental femoral condylar component finite element model of Embodiment 1.
Figure 7:
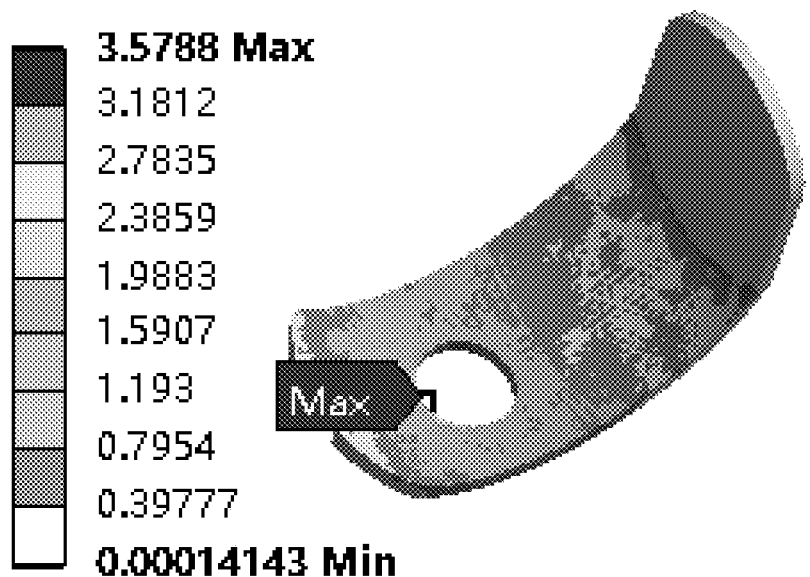
FIG. 7 shows the equivalent stress cloud chart of the uniform trabecular uni-compartmental femoral condylar component finite element model of Control Group 1.
Figure 8:
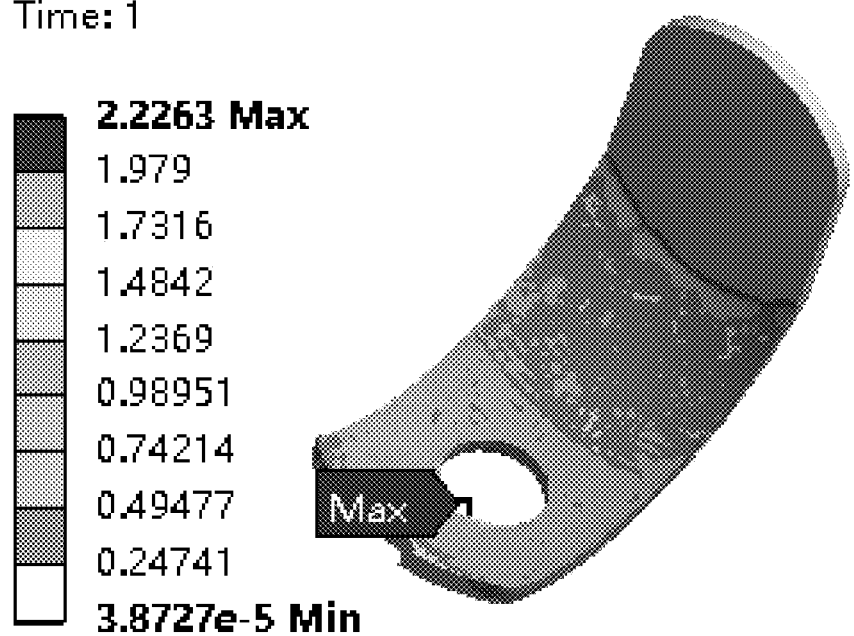
FIG. 8 shows the equivalent stress cloud chart of the trabecular uni-compartmental femoral condylar component finite element model of Embodiment 1.

The finite element model of Control Group 1 and Embodiment 1 and the simplified cancellous bone partitioning model of the femoral condylar component were analyzed by finite element analysis to obtain the contact pressure cloud chart (as shown in FIGS. 5-6) and equivalent stress cloud chart (as shown in FIGS. 7-8). Compared with the uniform trabecular femoral condylar component of Control Group 1, the finite element model of the uni-compartmental femoral condylar component in Embodiment 1 has more uniform contact pressure, suggesting that the bone growth performance is uniform. The maximum equivalent stress of the of the finite element model of the uni-compartmental femoral condylar component in Embodiment 1 is 2.23 MPa, which is reduced by about 37.8%; suggesting that the uni-compartmental femoral condylar component prepared by the present disclosure reduce the stress shielding effect and have excellent bone ingrowth. The result showed that the uni-compartmental femoral condylar component prepared by the present disclosure have excellent and uniform bone ingrowth performance, which can avoid prosthesis loosening caused by osteoporosis after long-term prosthesis implantation, and can obtain long-term stability.

The results of the finite element analysis show that the fretting cloud chart, contact pressure cloud chart and equivalent stress cloud chart of Embodiments 2 and 3 are similar to those of Embodiment 1.

Figure 9:
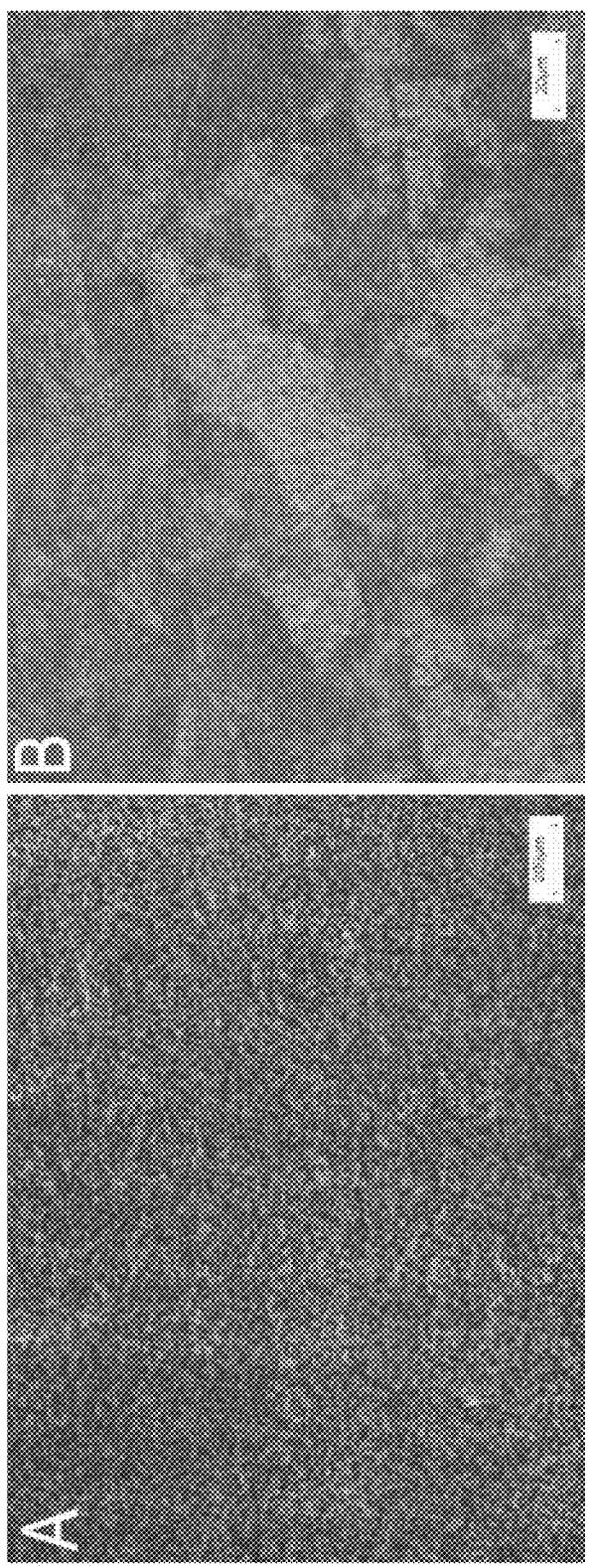
FIG. 9 shows the metallographic micro structure of the solid part in Control Group 2, wherein A is observed by 50 times magnification; B is observed by 500 times magnification.
Figure 10:
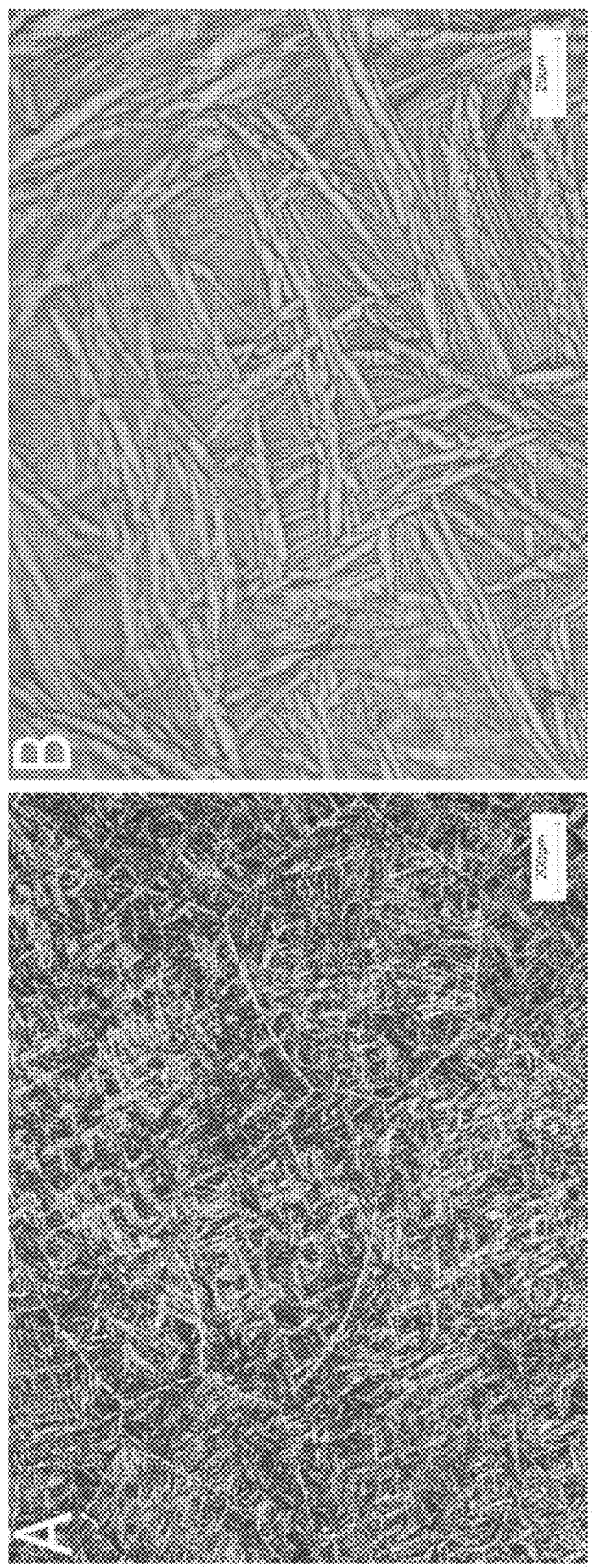
FIG. 10 shows the metallographic microscopic structure of the solid part in Embodiment 1 that has not prepared with step 4) and step 5) in the preparation method, wherein A is observed by 50 times magnification; B is observed by 500 times magnification.

A solid part in the control group 2 and a solid part of the embodiment 1 that has not been prepared with step 4) and 5) were observed and analyzed by an inverted scanning electron microscope (Axio Vert.A1, Zeiss, Germany). The results were shown in FIGS. 9-10. In the metallographic photos of the Control Group 2, small α martensite can be observed. The structure is small, easy for stress concentration, and the plasticity is poor. In the metallograph of Embodiment 1, a phase can be observed, basket net structure, grain refinement. The results indicated that the matrix (without oxidation layer) of the uni-compartmental femoral condylar component prepared by the present disclosure has excellent strength and plasticity.

Figure 11:
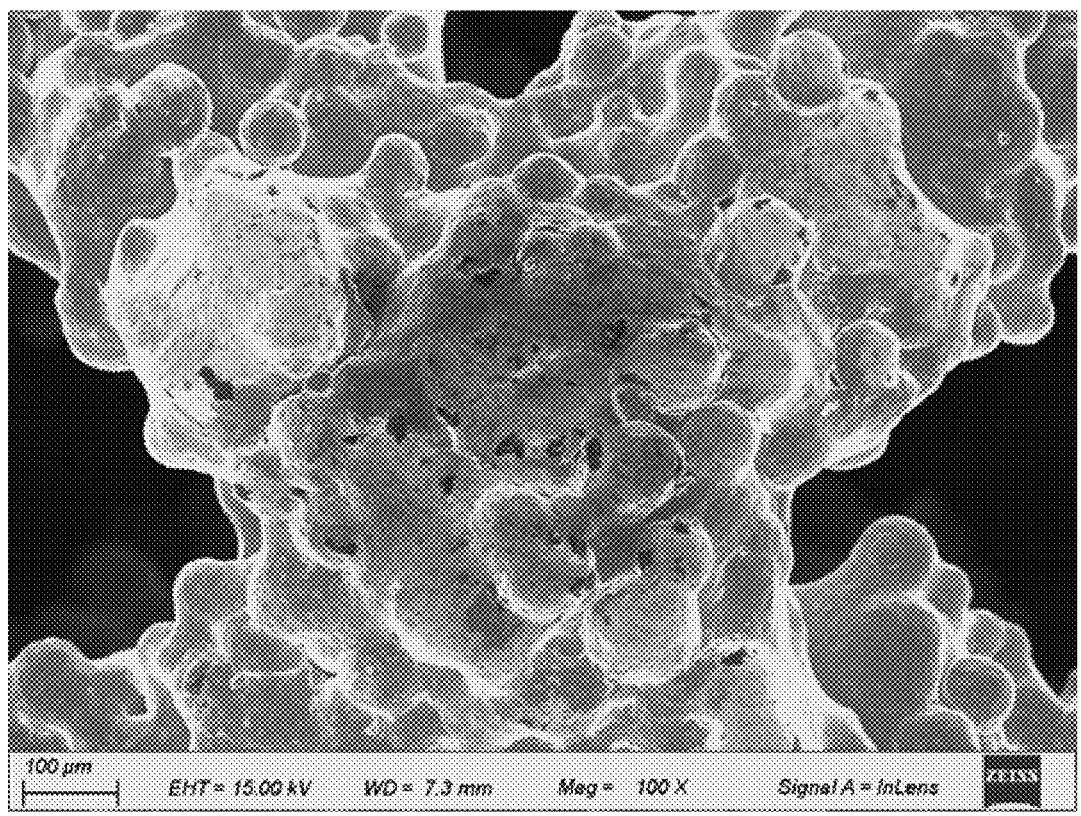
FIG. 11 shows SEM images of bone trabeculae in Control Group 2.
Figure 12:
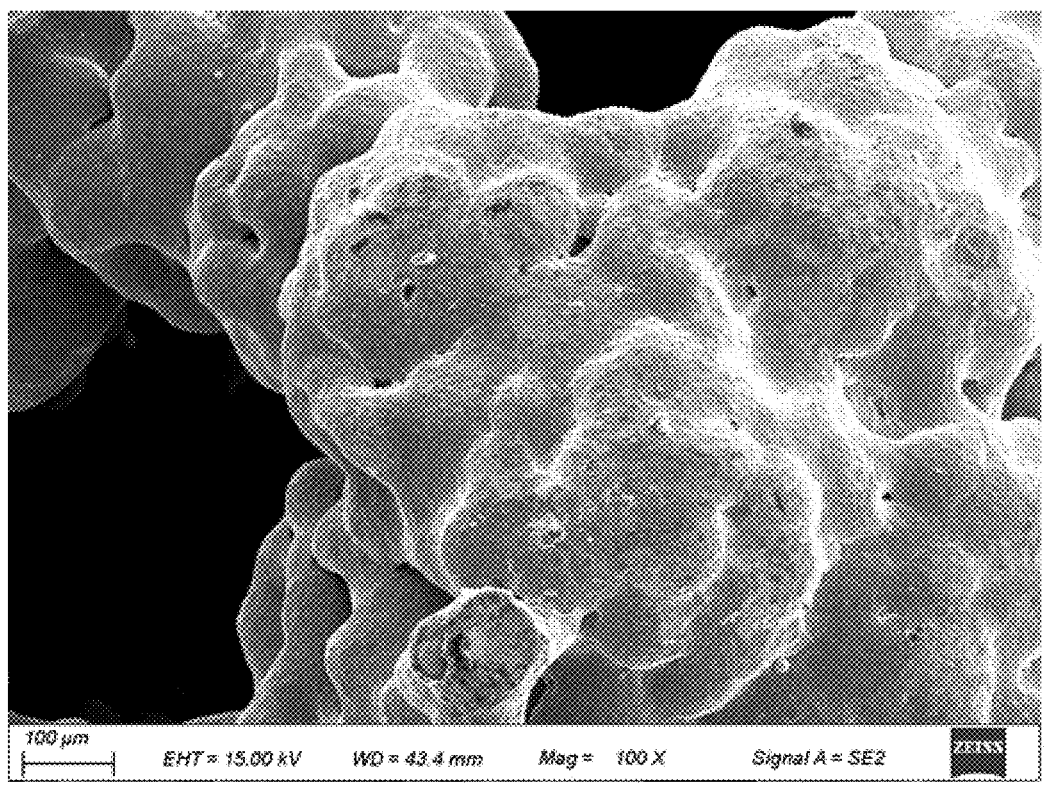
FIG. 12 shows SEM images of bone trabeculae in Embodiment 1 that has not been prepared with steps 4) and 5) of the preparation method.

As shown in FIGS. 11-12, the trabecular part of the control group 2 and the trabecular part of the embodiment 1 that has not been prepared with step 4) and 5) were observed and analyzed by scanning electron microscopy (Crossbeam340/550, Zeiss, Germany). Compared with the control group 2, the zirconium-niobium alloy powder of the trabecular part of the embodiment 1 was further sintered, suggesting that the overall performance of the bone trabeculae was improved.

A physical compression test piece (size: 8*8*10 mm$^3$) that has not been prepared with step 4) and 5) in the preparation method in the embodiment 1 and a physical compression test piece (size: 8*8*10 mm$^3$) in the control group 2 were subjected to a compression performance test by an electronic universal testing machine (UTM5105, Shenzhen SUNS Technology Co., Ltd., and China). There were 5 physical compression test pieces respectively in the embodiment 1 and the control group 2. Results were shown in Table 1. The compressive yield strength of embodiment 1 is 546.72 MPa, better than that of Control Group 2 (P<0.05), suggesting that the solid part prepared by the present disclosure has excellent anti-compression performance.

TABLE 1

Anti-compression experiment results of the solid specimens of Control Group 2 and Embodiment 1
($\bar{x} \pm s$, n = 5, *P < 0.05, compared with Control Group 2)

| Group | Cross-sectional Area (mm$^2$) | Yield Load (kN) | Yield Strength (MPa) |
|---|---|---|---|
| Embodiment 1 | 64 | 34.99 ± 4.04* | 546.72 ± 63.19* |
| Control Group 2 | 64 | 23.59 ± 2.30 | 368.63 ± 35.92 |

A bone trabeculae compression specimens with pore size of 0.50 mm and porosity of 70% of the Control Group 2 and the bone trabeculae compression specimens with pore size of 0.50 mm and porosity of 70% of Embodiment 1 (specimen size: 8*8*10 mm$^3$) that has not been prepared with step 4) and step 5) of the above-mentioned preparation method, were subjected to a compression test by the electronic universal testing machine (UTM5105, Shenzhen SUNS Technology Co., Ltd., and China). Bone trabeculae compression specimens of the Control Group 2 and the Embodiment 1 were 5 pieces each. The results are shown in Table 2. The compressive yield strength of Embodiment 1 is 19.21 MPa, significantly better than that of Control Group 2 ($P<0.05$), suggesting that the bone trabecular part of the femoral condylar component prepared by the present disclosure has excellent anti-compression performance.

TABLE 2

Anti-compression experiment results of the bone trabecular specimens of Control Group 2 and Embodiment 1 ($\bar{x} \pm s$, n = 5, *P < 0.05, compared with Control Group 2)

| Group | Cross-sectional Area (mm²) | Yield Load (N) | Yield Strength (MPa) |
| --- | --- | --- | --- |
| Embodiment 1 | 64 | 1229.48 ± 101.72* | 19.21 ± 1.59* |
| Control Group 2 | 64 | 961.98 ± 93.1 | 15.03 ± 1.45 |

Figure 13:
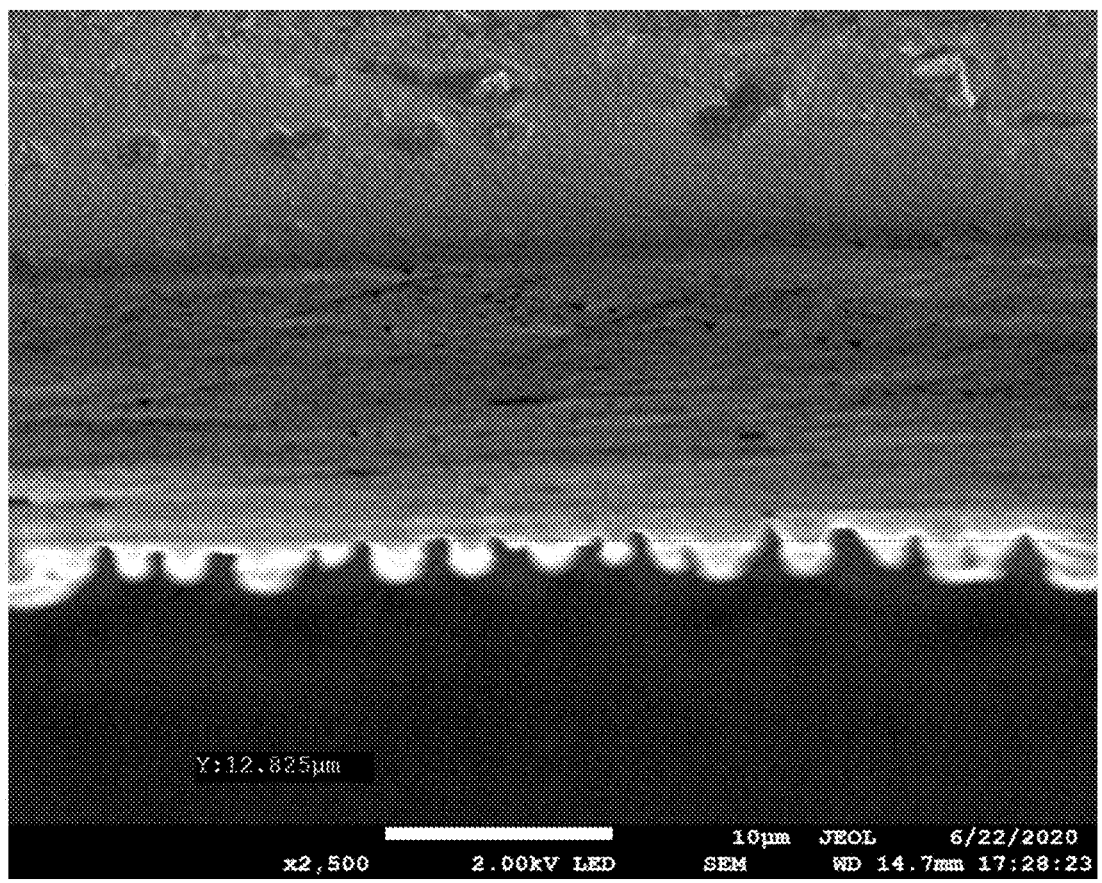
FIG. 13 shows the SEM of cross-section between the oxidation layer and the matrix in Embodiment 1.

The cross-section of the matrix and oxidation layer of the zirconium-niobium alloy of Embodiment 1 was observed by scanning electron microscopy (Crossbeam340/550, Zeiss, Germany) (see FIG. 13). The cross sections of the matrix and oxidation layer of the zirconium-niobium alloy in Embodiments 2 and 3 were observed. The oxidation layer thickness were 10.3 μm, 17.2 μm and 20.6 μm, respectively. There was an oxygen-rich layer between the oxidation layer and the matrix of the zirconium-niobium alloy to enhance the bonding force between the matrix and oxidation layer of zirconium-niobium alloy.

Figure 14:
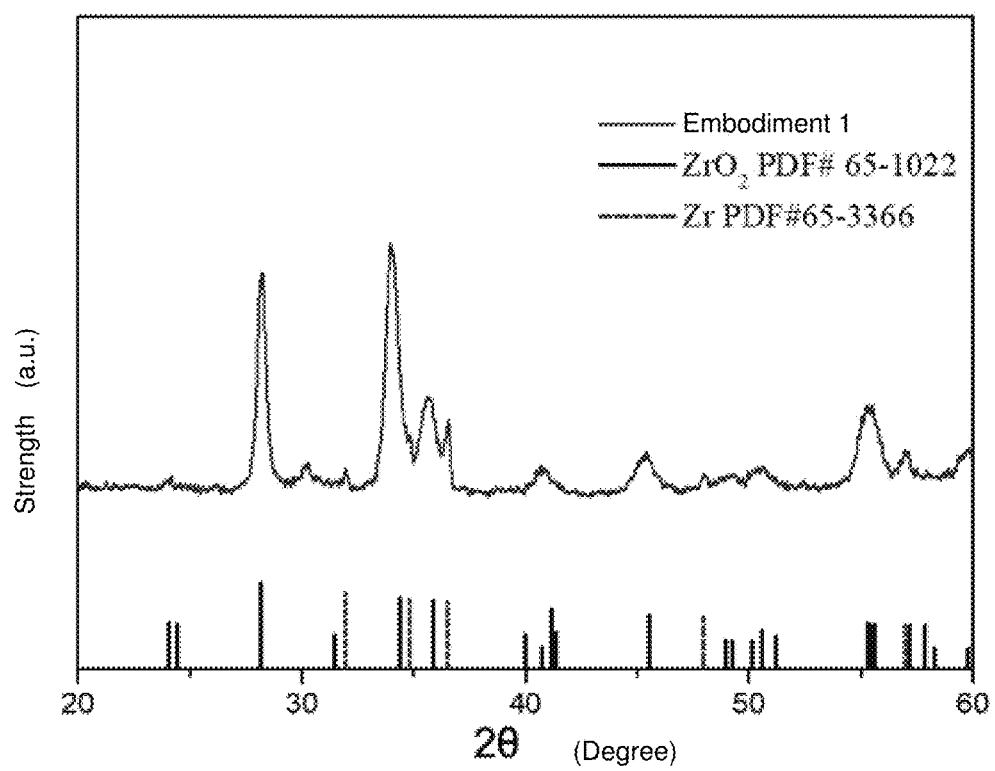
FIG. 14 shows the XRD curve of the oxidation layer surface in Embodiment 1.

XRD (D8DISCOVER, Bruker, Germany) analyzed the oxidation layer of the zonal trabecular uni-compartmental femoral condylar component of Embodiment 1 (as shown in FIG. 14). The oxidation layer contained monoclinic phase zirconia and tetragonal phase zirconia.

The microhardness measurement on the zonal trabecular uni-compartmental femoral condylar component of Embodiments 1-3 was determined by a microhardness tester (MHVS-1000 PLUS, Shanghai Aolongxingdi Testing Equipment Co., Ltd., China), in which the load was 0.05 kg, the load time of the specimens was 20 s, and 8 points were taken for each specimen. The average hardness values measured in Embodiments 1-3 were 1948.6 Hv, 1923.7 Hv, and 1967.2 Hv, suggesting that the oxidation layer in the zonal trabecular uni-compartmental femoral condylar component of the present disclosure has high hardness.

Experiments have proved that the zirconium-niobium alloy powder bonding degree, compressive properties, solid part of the compressive properties, metallographic structure, the crystal structure, thickness and hardness of the oxidation layer for the zonal trabecular uni-compartmental femoral condylar component prepared in Embodiments 2 and 3, are similar to that prepared in Embodiment 1.

The invention claimed is:

1. A preparation method of a zonal trabecular uni-compartmental femoral condylar component containing zirconium-niobium alloy with an oxidation layer, the method comprising the following steps:
   1) Using zirconium-niobium alloy powder as a raw material, conducting a 3D printing for one-piece molding, and obtaining a first intermediate product of the zonal trabecular uni-compartmental femoral condylar component containing zirconium-niobium alloy with the oxidation layer, putting the first intermediate product into a Sinter-HIP furnace, heating to 1250° C. under helium/argon gas protection, and placing at a constant pressure of 180 MPa for 3 h, and reducing to an atmospheric pressure, cooling to below 200° C. with the furnace, taking it out, and obtaining a second intermediate product;
   2) Putting the second intermediate product into a programmable thermostat, cooling to −80° C. at a rate of 1° C./min, keeping the second intermediate product at a constant temperature of −80° C. for 10 h, and taking the second intermediate product out of the programmable thermostat; and putting it into a liquid nitrogen for 16 h, and adjusting the temperature to room temperature so as to obtain a third intermediate product;
   3) Putting the third intermediate product in the programmable thermostat, cooling to −80° C. at a rate of 1° C./min, and placing the third intermediate product at a constant temperature of −80° C. for 10 h, taking the third intermediate product out of the programmable thermostat, and putting the third intermediate product into the liquid nitrogen for 16 h, and adjusting the temperature to room temperature so as to obtain a fourth intermediate product;
   4) Machining, finishing, polishing, cleaning, and drying the fourth intermediate product, and obtaining a fifth intermediate product, where an upper surface roughness of an articular surface of the fifth intermediate product is Ra=0.12 μm;
   5) Putting the fifth intermediate product into a tube furnace, introducing an atmospheric pressure helium/argon gas containing 5% oxygen in percentage by mass, heating to 500° C. at 5° C./min, and cooling to 400° C. at 0.4° C./min, and cooling to be below 200° C. sequentially, take the fifth intermediate product out to obtain the zonal trabecular uni-compartmental femoral condylar component containing zirconium-niobium alloy with the oxidation layer;
   the structure of the zonal trabecular uni-compartmental femoral condylar component containing zirconium-niobium alloy with the oxidation layer is same as the structure of the first intermediate product, the second intermediate product, the third intermediate product, the fourth intermediate product and the fifth intermediate product;
   the zonal trabecular uni-compartmental femoral condylar component containing zirconium-niobium alloy with the oxidation layer includes an articular surface (1) and an osseointegration surface (2), a longitudinal section of the articular surface (1) is arc-shaped, the osseointegration surface (2) comprises a rear osseointegration surface (21) and a distal osseointegration surface (22), the rear osseointegration surface (21) is arranged in a vertical plane, the distal osseointegration surface (22) is arc-shaped which has a common spherical center with the articular surface (1); a first cylindrical fixation (4) is arranged in the middle of the distal osseointegration surface (22), a second cylindrical fixation (5) is arranged at the front of the distal osseointegration surface (22); and the diameter of the second cylindrical fixation 5 is smaller than that of the first cylindrical fixation (4); a side wall (3) is arranged at the edge of the osseointegration surface (2), a bone trabeculae 6 is arranged in the side wall (3) except the location where connecting the first cylindrical fixation (4) and the second cylindrical fixation (5); a bone trabecular partition line (7) is positioned in the middle of the front and rear direction of the osseointegration surface (2); a first bone trabeculae (8) and a second bone trabeculae (9) are respectively arranged before and after the bone trabecular partition line (7); and the pore size and porosity of the first bone trabeculae (8) is smaller than those of the second bone trabeculae (9).

2. The preparation method of the zonal trabecular uni-compartmental femoral condylar component containing zirconium-niobium alloy with an oxidation layer according to claim 1, wherein the pore size of the first bone trabeculae (8) ranges from 0.40 mm to 0.60 mm, and the porosity ranges from 60% to 75%; the pore size of the second bone trabeculae (9) ranges from 0.61 mm to 0.80 mm, and the porosity ranges from 76% to 90%; a thickness of each of the first bone trabeculae (8) and the second bone trabeculae (9) is equal to 1.5 mm.

3. The preparation method of the zonal trabecular uni-compartmental femoral condylar component containing zirconium-niobium alloy with an oxidation layer according to claim 1, wherein the chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 m.

4. A zonal trabecular uni-compartmental femoral condylar component containing zirconium-niobium alloy with an oxidation layer prepared by the preparation method according to claim 1.

5. The zonal trabecular uni-compartmental femoral condylar component of claim 4, wherein the pore size of the first bone trabeculae (8) ranges from 0.40 mm to 0.60 mm, and the porosity ranges from 60% to 75%; the pore size of the second bone trabeculae (9) ranges from 0.61 mm to 0.80 mm, and the porosity ranges from 76% to 90%; a thickness of each of the first bone trabeculae (8) and the second bone trabeculae (9) is equal to 1.5 mm.

6. The zonal trabecular uni-compartmental femoral condylar component of claim 4, wherein the chemical composition of the zirconium-niobium alloy powder in percentage by mass is respectively 85.6%-96.5% of Zr, 1.0%-12.5% of Nb, and the rest are unavoidable impurities; where a particle size of the zirconium-niobium alloy powder ranges from 45 to 150 m.

* * * * *